United States Patent
O'Rorke et al.

(10) Patent No.: US 11,635,097 B1
(45) Date of Patent: Apr. 25, 2023

(54) ACTUATOR WITH END STOP VALVE

(71) Applicant: Hamilton Sundstrand Corporation, Charlotte, NC (US)

(72) Inventors: Morgan O'Rorke, West Hartford, CT (US); Frank Perrelli, East Haven, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/724,682

(22) Filed: Apr. 20, 2022

(51) Int. Cl.
*F15B 15/14* (2006.01)
*F15B 15/22* (2006.01)

(52) U.S. Cl.
CPC ...... *F15B 15/1404* (2013.01); *F15B 15/1447* (2013.01); *F15B 15/225* (2013.01)

(58) Field of Classification Search
CPC F15B 15/225; F15B 15/1404; F15B 15/1447; F15B 15/20
See application file for complete search history.

(56) References Cited

U.S. PATENT DOCUMENTS

| | | | | |
|---|---|---|---|---|
| 2,783,742 A * | 3/1957 | Shafer | ................... | F16K 31/122 91/452 |
| 2,929,212 A * | 3/1960 | Lewis | ................. | F15B 15/1485 91/422 |
| 3,162,093 A * | 12/1964 | Zoller | ................... | F01L 25/063 91/309 |
| 3,413,895 A * | 12/1968 | Matthews | ................. | F02K 1/15 91/452 |
| 4,189,983 A | 2/1980 | Fassbender et al. | | |
| 7,281,464 B2 * | 10/2007 | Weiler, Jr. | ............. | F15B 15/261 91/44 |
| 9,574,578 B2 * | 2/2017 | Frick | ..................... | F15B 15/202 |
| 11,035,392 B2 | 6/2021 | Seminel et al. | | |
| 2009/0078110 A1 * | 3/2009 | Waldmann | ............ | F15B 15/202 91/403 |
| 2017/0159832 A1 | 6/2017 | Hilzendegen et al. | | |
| 2018/0320715 A1 | 11/2018 | Haugsjaahabink | | |

FOREIGN PATENT DOCUMENTS

DE 102004029990 * 6/2004 ............ F15B 15/225

* cited by examiner

*Primary Examiner* — Dustin T Nguyen
(74) *Attorney, Agent, or Firm* — Cantor Colburn LLP

(57) ABSTRACT

Actuator systems and methods of operation are disclosed. The systems include a hydraulic actuator having a primary piston having a piston head arranged within a housing defining retract and extend chambers on opposite sides of the piston head. A control element is configured to control a supply of pressure to each of the retract and extend chambers. An actuator valve is coupled to the housing and includes a secondary piston that is biased into the retract chamber in an open flow state and when the primary piston is in a fully retracted state the piston head urges the secondary piston into a closed flow state. The actuator valve defines a flow chamber where, in an open flow state, fluid can be passed through the flow chamber and in a closed flow state the fluid is prevented from passing through the flow chamber.

17 Claims, 3 Drawing Sheets

US 11,635,097 B1

ACTUATOR WITH END STOP VALVE

BACKGROUND

The following description relates to hydraulic actuators and, more particularly, to a hydraulic actuator systems that include an end-stop valve.

In aircraft systems, components of the engine and/or other components onboard an aircraft may require actuation during operation thereof. Such actuation may be provided by an actuator, such as a linear actuator or the like. The actuation of such actuators provides a primary functionality thereto. However, it may be advantageous to leverage further functionality from onboard actuators on aircraft.

BRIEF DESCRIPTION

According to some embodiments of the present disclosure, actuator systems are provided. The actuator systems include a hydraulic actuator having a primary piston having a piston head arranged within a housing, the primary piston actuatable between a fully retracted position and a fully extended position, the hydraulic actuator defining an adjustable retract chamber on a first side of the piston head and an adjustable extend chamber on a second side of the piston head opposite the first side. A control element is configured to control a supply of pressure to each of the retract chamber and the extend chamber. An actuator valve is coupled to the housing of the hydraulic actuator, the actuator valve having a secondary piston that is biased into the retract chamber in an open flow state and when the primary piston is in a fully retracted state the piston head urges the secondary piston into a closed flow state. The actuator valve defines a flow chamber therein, wherein in the open flow state fluid can be passed through the flow chamber and in the closed flow state the fluid is prevented from passing through the flow chamber.

In addition to one or more of the features described herein, or as an alternative, further embodiments of the actuator systems may include that the actuator valve includes a biasing element configured to bias the secondary piston into the open flow state.

In addition to one or more of the features described herein, or as an alternative, further embodiments of the actuator systems may include that the control element is an electrohydraulic servo valve.

In addition to one or more of the features described herein, or as an alternative, further embodiments of the actuator systems may include an extension pressure line hydraulically coupling the control element and the extend chamber of the hydraulic actuator and a retraction pressure line hydraulically coupling the control element and the retract chamber of the hydraulic actuator.

In addition to one or more of the features described herein, or as an alternative, further embodiments of the actuator systems may include that the fluid passing through the actuator valve is a cooling fluid.

In addition to one or more of the features described herein, or as an alternative, further embodiments of the actuator systems may include a piston cooling chamber arranged about a portion of the primary piston, wherein the piston cooling chamber is fluidly connected to the flow chamber of the actuator valve.

In addition to one or more of the features described herein, or as an alternative, further embodiments of the actuator systems may include that the fluid is passed through the flow chamber to the piston cooling chamber and then to a downstream system.

In addition to one or more of the features described herein, or as an alternative, further embodiments of the actuator systems may include an aircraft system, wherein the primary piston is configured to actuate a component of the aircraft system.

According to some embodiments, methods of operating actuator systems are provided. The methods include supplying hydraulic fluid to a retract chamber of a hydraulic actuator to cause a primary piston to fully retract within a housing, urging a secondary piston of an actuator valve into a closed flow state by application of force from a piston head of the primary piston and against a biasing force applied to the secondary piston, transitioning the primary piston from a fully retracted state toward an extended state and exposing a retract chamber within the housing of the hydraulic actuator, urging the secondary piston into an open flow state of the actuator valve, wherein a portion of the secondary piston extends into the retract chamber to expose a flow chamber of the actuator valve, and passing a fluid through the flow chamber of the actuator valve when the actuator valve is in the open flow state.

In addition to one or more of the features described herein, or as an alternative, further embodiments of the methods may include that the actuator valve includes a biasing element configured to applying the biasing force to the secondary piston and toward the open flow state.

In addition to one or more of the features described herein, or as an alternative, further embodiments of the methods may include that actuator system comprises a control element configured to supply the hydraulic fluid to each of the retract chamber and an extend chamber defined within the housing of the hydraulic actuator.

In addition to one or more of the features described herein, or as an alternative, further embodiments of the methods may include that the control element is an electrohydraulic servo valve.

In addition to one or more of the features described herein, or as an alternative, further embodiments of the methods may include an extension pressure line hydraulically coupling the control element and the extend chamber of the hydraulic actuator and a retraction pressure line hydraulically coupling the control element and the retract chamber of the hydraulic actuator.

In addition to one or more of the features described herein, or as an alternative, further embodiments of the methods may include that the fluid passing through the actuator valve is a cooling fluid.

In addition to one or more of the features described herein, or as an alternative, further embodiments of the methods may include a piston cooling chamber arranged about a portion of the primary piston, wherein the piston cooling chamber is fluidly connected to the flow chamber of the actuator valve.

In addition to one or more of the features described herein, or as an alternative, further embodiments of the methods may include passing the fluid through the flow chamber to the piston cooling chamber and then to a downstream system.

In addition to one or more of the features described herein, or as an alternative, further embodiments of the methods may include an aircraft system coupled to the actuator system, the method further comprising actuating a component of the aircraft system by movement of the primary piston between the fully retracted state and the fully extended state.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Actuators are employed onboard aircraft to provide means to actuate various components and/or control fluid flow or the like. For example, an onboard actuator may be configured to control a valve or the like, such as for fuel flow, coolant flow, lubricating oil flow, working fluid for various systems, and the like. It may be desirable to mechanically control the position of a secondary valve through the positioning of an actuator. In view of this, embodiments of the present disclosure are directed to schemes for on/off flow utilizing a valve that is actuated by an actuator piston. For certain operating conditions, it can be desirable to reduce parasitic flow that may drive system sizing (e.g., cooling flow). For example, such operating conditions may include, without limitation, engine start and/or may be based on other conditions that drive system sizing, and it may be desirable to reduce parasitic flow throughout the envelope. For example, reduced parasitic flow at low pump capabilities may improve system sizing, and increased flow for such things as cooling at high temperature operating conditions may allow for greater design optimization around edge of the envelop conditions such as start or maximum takeoff power.

Figure 1A:
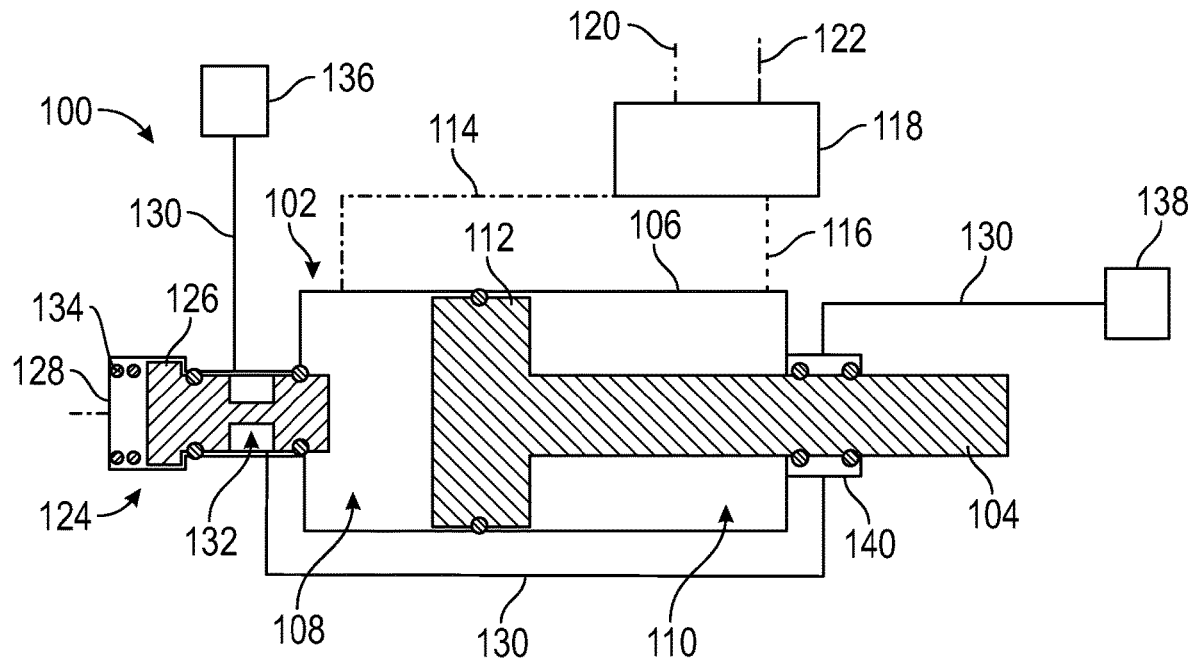
FIG. 1A is a schematic illustration of an actuator system in accordance with an embodiment of the present disclosure, showing an open flow state of a valve assembly.
Figure 1B:
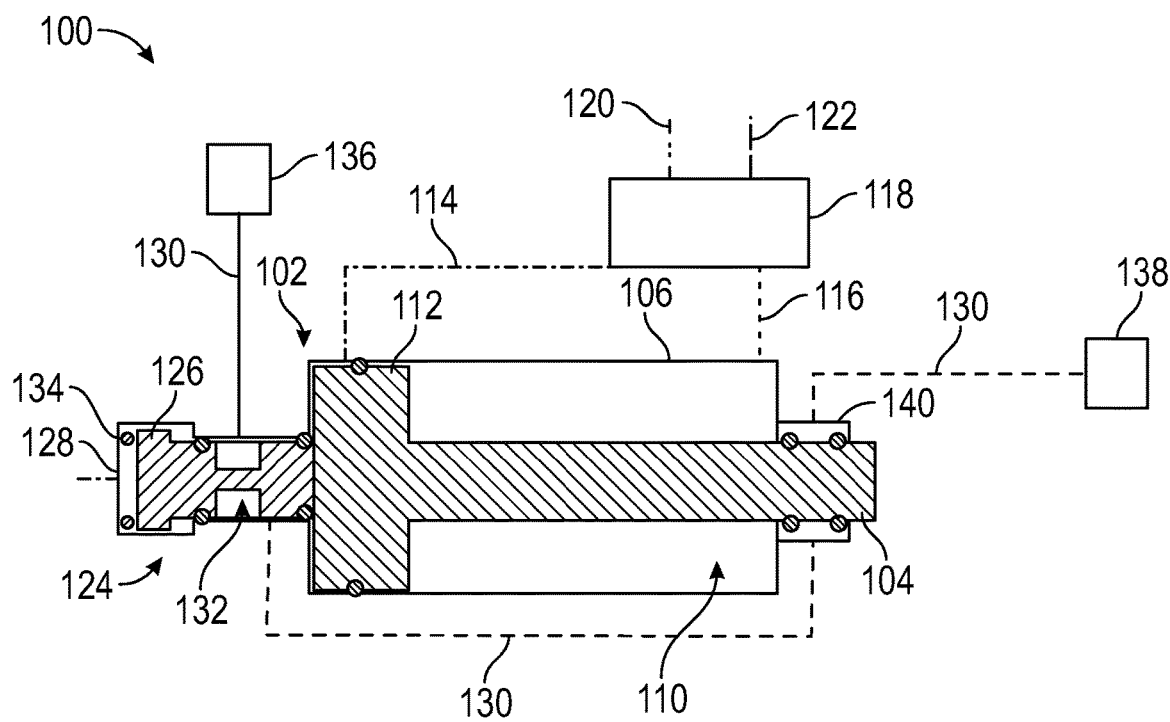
FIG. 1B is a schematic illustration of the actuator system of FIG. 1A, showing a closed flow state of the valve assembly.

Referring to FIGS. 1A-1B, schematic illustrations of an actuator system 100 in accordance with an embodiment of the present disclosure are shown. The actuator system 100 includes a hydraulic actuator 102 including a primary piston 104 that is translatable within a housing 106. The housing 106 defines a retract chamber 108 and an extend chamber 110 on opposite sides of a piston head 112. The retract chamber 108 is fluidly connected to an extension pressure line 114 and the extend chamber 110 is fluidly connected to a retraction pressure line 116. Each of the extension pressure line 114 and the retraction pressure line 116 are fluidly connected to a control element 118 (e.g., an electrohydraulic servo valve). The control element 118 is configured to control the amount of pressure in each of the retract chamber 108 and the extend chamber 110 to cause translational movement of the piston head 112 relative to the housing 106 and thus control an extension or retraction of the primary piston 104. The control element 118 is operably connected to a high pressure line 120 and a low pressure line 122 for the purpose of controlling the amount or level of pressure in the chambers 108, 110 by adjusting flow and/or hydraulic coupling through or between the chambers 108, 110.

The actuator system 100 thus provides actuation through controlling movement of the primary piston 104. The actuator system 100, in this illustrative embodiment, also incorporates an actuator valve 124 that is operably coupled to the hydraulic actuator 102. The actuator valve 124 includes a secondary piston 126 arranged within a valve housing 128. The actuator valve 124 is fluidly coupled and arranged to control a fluid flow through a flow line 130. As shown, the actuator valve 124 is mechanically coupled to or part of the hydraulic actuator 102 and is positioned at an end of the housing 106 opposite the primary piston 104 of the hydraulic actuator 102. The actuator valve 124 includes a flow chamber 132 that is arranged to selectively control flow through the actuator valve 124. For example, the secondary piston 126 includes a cut out or reduced diameter portion that defines the flow chamber 132. The secondary piston 126 is biased by a biasing element 134 toward (and into) the retract chamber 108 of the housing 106 of the hydraulic actuator 102.

FIG. 1A illustrates the actuator valve 124 in an open flow position and FIG. 1B illustrates the actuator valve 124 in a closed flow position. The flow line 130 is arranged to have an inlet 136 and an outlet 138. In some embodiments, the inlet 136 may be a source of fluid that passes through the flow line 130, such as a source of oil or other cooling fluid and the outlet 138 may be a downstream component that can receive such cooling fluid or may be a reentry point into a cooling flow system or a closed loop cooling system.

When the actuator valve 124 is in the open flow position (FIG. 1A), a flow of fluid through the flow line 130 is possible, with a fluid passing from the inlet 136, through the flow chamber 132 of the actuator valve 124, and to the outlet 138. In some embodiments, the flow line 130 may be coupled to a piston cooling chamber 140 that is arranged about a portion of the piston 104. As such, when the actuator valve 124 is in the open flow position (FIG. 1A), cooling flow may be provided to the piston 104 and other downstream components that may be represented schematically as outlet 138. In the open flow position, the secondary piston 126 extends, at least partially, into the retract chamber 108. This extension may be ensured by the biasing element 134 and/or by a hydraulic fluid arranged within the valve housing 128.

When the primary piston 104 is moved from an extended stated (FIG. 1A) to a retracted state (FIG. 1B), the piston head 112 of the primary piston 104 will contact the secondary piston 126 and urge the secondary piston 126 against the biasing element 134 and move the secondary position 126 within the valve housing 128. When the secondary piston 126 is transitioned from the open flow position to the closed flow position, the flow chamber 132 will be shifted such that the flow line 130 is not fluidly connected to the flow chamber 132. As such, a fluid flow through the flow line 130 is prevented when the primary piston 104 is in the fully retracted state (FIG. 1B) because such position of the primary piston 104 will urge or keep the secondary piston in the closed flow position. As such, no flow will pass through the flow line 130 to the piston cooling chamber 140 and/or the outlet 138 (or other downstream components/systems).

As shown and described above, the hydraulic actuator 102 contains or includes an actuator valve 124 coupled to the retract chamber 108 to allow for controlling a secondary function via the position of the piston 104 of the hydraulic actuator 102. In some embodiments, the actuator system 100 provides for an on/off piston-end cooling scheme. Using such an actuator system 100 allows for no/reduced system flows at certain conditions (e.g., engine start). It will be appreciated that in such an example (e.g., engine start), it is assumed that engine start position of the hydraulic actuator 102 is fully retracted (as shown in FIG. 1B). Such a position of the primary piston 104 causes the secondary piston 126 of the actuator valve 124 to be in a closed or no flow state, shutting off rod-end cooling flow. When the primary piston 104 is moved off an end position (e.g., fully retracted), the actuator valve 124 is transitioned to the open flow position and provides cooling flow through the flow chamber 132.

Figure 2:
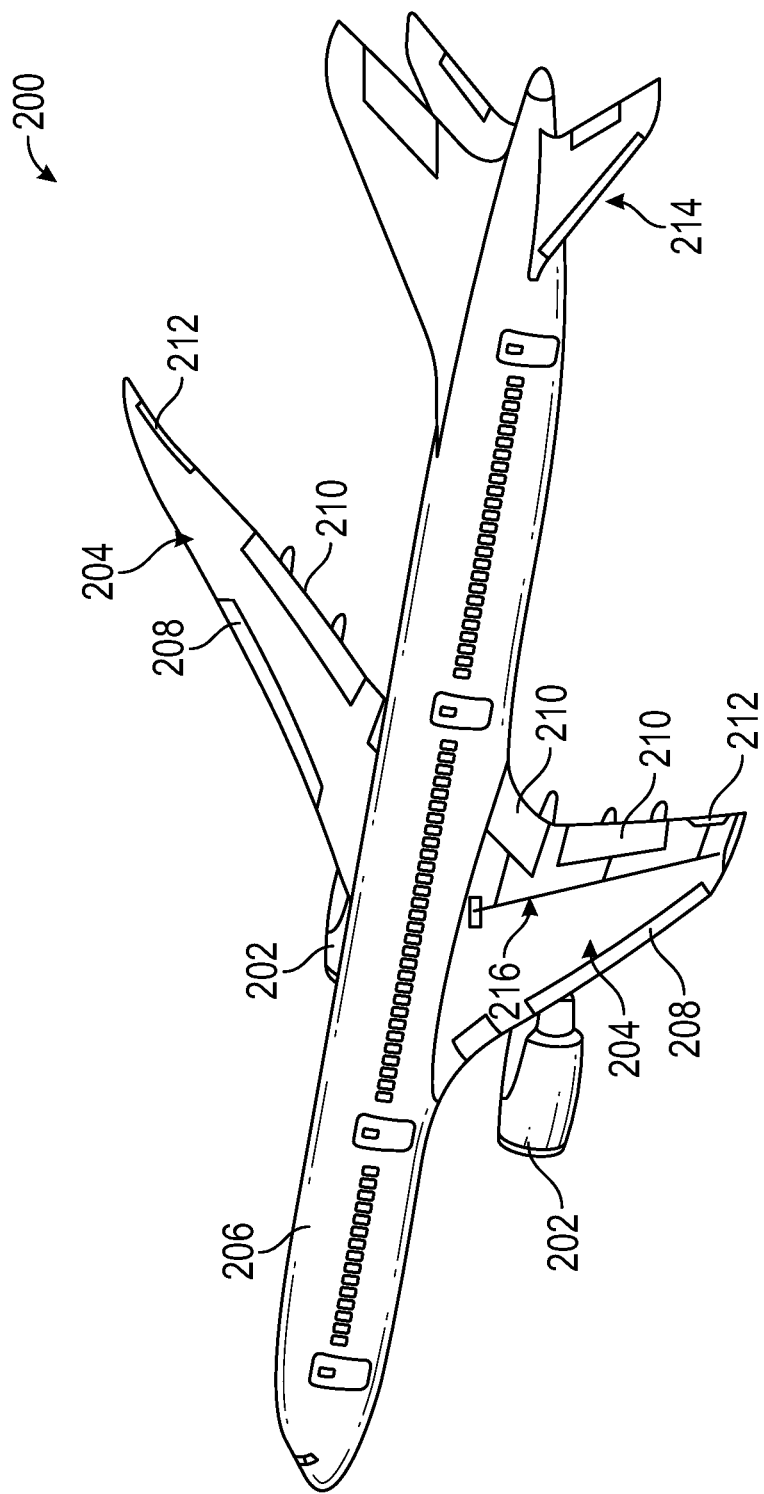
FIG. 2 is a schematic illustration of an aircraft that may incorporate embodiments of the present disclosure.

FIG. 2 illustrates an example of an aircraft 200 having aircraft engines surrounded by (or otherwise carried in) nacelles 202. The aircraft 200 includes wings 204 that extend from an aircraft fuselage 206. Each wing 204 may include one or more slats 208 on a forward edge or leading edge and one or more flaps 210 on an aft, rear, or trailing edge thereof. The wings 204 may also include ailerons 212 on the trailing edges, as will be appreciated by those of skill in the art. The aircraft 200, as shown, includes a tail structure 214 which can include various flaps, ailerons, slats, and the like, as will be appreciated by those of skill in the art. The flaps, slats, ailerons, and the like are generally referred to herein as "aerostructures" as they are movable under aircraft power systems and are configured to control flight and motion of the aircraft 200. An aerostructure actuator system 216 may be connected to one or more of the aerostructures. For example, each wing 204 and the tail structure 214 may include one or more aerostructure actuator systems 216. The aerostructure actuator systems 216 may be operably connected to the various aerostructures and configured control the operation/position of the aerostructures to control flight of the aircraft 200. In some embodiments, the aerostructure actuator systems 216 can include one or more actuator systems such as shown and described above with respect to FIGS. 1A-1B. Further, the engines of the aircraft 200 may include various actuators and control mechanisms that can incorporate one or more actuator systems such as shown and described above with respect to FIGS. 1A-1B. As such, the described actuator systems of the present disclosure may be incorporated into aircraft engine systems and/or aircraft flight systems. It will be appreciated that such actuator systems as described herein may be used for other purposes onboard aircraft, such as for actuating doors, landing gear, or the like.

Figure 3:
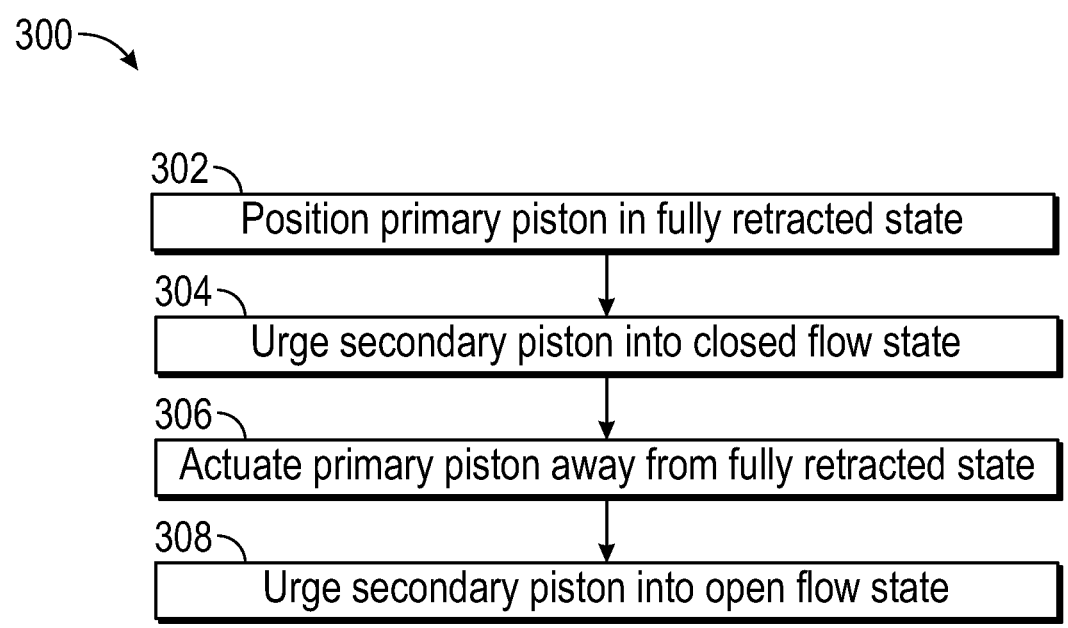
FIG. 3 is a flow process for operation of an actuator system in accordance with an embodiment of the present disclosure.

Turning now to FIG. 3, a flow process 300 for operating an actuator system in accordance with an embodiment of the present disclosure. The flow process 300 is designed for operating an actuator system such as that shown and described above. Specifically, the flow process 300 operation is functional with a hydraulic actuator having a primary piston and an actuator valve having a secondary piston that is coupled to the hydraulic actuator. The actuator system is configured to provide a primary operation through actuation of the primary piston and a secondary operation through actuation of the secondary piston. The operation of the secondary piston is in response to actuation of the primary piston.

At block 302, the primary piston is positioned in a fully retracted state. In the fully retracted state, a piston head of the primary piston is moved to an end stop of the hydraulic actuator. This may be achieved through operation or control from an electrohydraulic servo valve that is operably coupled to the hydraulic actuator. The fully retracted state may also be a default state of the hydraulic actuator. In some embodiments, the retracted state of the hydraulic actuator may be a state for engine start when the hydraulic actuator is employed on a gas turbine engine or the like.

At block 304, the primary piston urges the secondary piston into a closed flow state, when the primary piston is in the fully retracted state. The primary piston, in the fully retracted state, contacts the secondary piston and applies a force thereto to compress a biasing element. The biasing element is configured to urge the secondary piston into an open flow state. However, when the primary piston is in the fully retracted state, the secondary piston is caused to be in the closed flow state and the biasing element is compressed. In the closed flow state, the secondary piston of the actuator valve is arranged to prevent fluid flow through a flow chamber that is defined, in part, by the secondary piston.

At block 306, the primary piston is actuated and moved away from the fully retracted position. That is, hydraulic fluid(s) is used to cause actuator and movement of the primary piston from the fully retracted state into an extended state (partial or fully extended). As the primary piston is moved away from the fully retracted state, the force applied to the secondary piston is removed. As the primary piston is moved away from the fully retracted state, a retract chamber of the hydraulic actuator will be exposed.

At block 308, as the force from the primary piston is removed from the secondary piston, the biasing mechanism will urge the secondary piston into the retract chamber of the hydraulic actuator. As the secondary piston is actuated and moves into the retract chamber, a flow chamber of the actuator valve will be opened, allowing for fluid flow through the actuator valve. The fluid flow through the actuator valve can provide a secondary function of the actuator assembly, with the primary function being the actuation of the primary piston of the hydraulic actuator.

In some embodiments, the flow through the flow chamber of the actuator valve may be used for cooling of a portion of the primary piston. For example, a cooling flow may be passed through the flow chamber and directed to a piston cooling chamber that surrounds a portion of the primary piston. The fluid flow may be oil or other cooling fluid that can provide thermal cooling and, in some configuration, lubrication for movement and actuation of the primary piston. The cooling flow may then be passed to other downstream systems for cooling and/or recycled back into a cooling loop or other system, as will be appreciated by those of skill in the art. In some embodiments, the piston cooling chamber may be omitted, and the flow through the flow chamber of the actuator valve may be directed to some other downstream system, with the supply of fluid based on the position of the primary and secondary pistons of the actuator system.

Advantageously, embodiments of the present disclosure provide for improved actuators for use onboard aircraft. The actuator systems described herein include a primary actuator (e.g., hydraulic actuator) and a secondary actuator (e.g., actuator valve). In operation, the primary actuator directly controls the position and operation of the secondary actuator. For example, when the primary actuator is in a fully retracted state, the primary piston of the primary actuator applies a force to close the secondary actuator and prevent a fluid flow through the secondary actuator. Advantageously, in accordance with some embodiments, a hydraulic actuator is provided with a spring-loaded valve within or coupled to an end stop of the hydraulic actuator. When a piston of hydraulic actuator is in a retracted state, the valve is shuttled and a secondary function can be controlled. The secondary function can be passively controlled through positioning of the hydraulic actuator. This may be beneficial to control a secondary function without adding addition input/output components and/or associated electronics or it may be useful for controlling the activation of a backup mode upon a failure condition.

The terms "about" and "substantially" are intended to include the degree of error associated with measurement of the particular quantity based upon the equipment available at the time of filing the application. For example, "about" can include a range of ±8% or 5%, or 2% of a given value.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The term "a plurality" is understood to include any integer number greater than or equal to two, i.e., two, three, four, five, etc. The term "connection" can include an indirect "connection" and a direct "connection".

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently (or simultaneously), or the blocks may sometimes be executed in the reverse order, depending upon the functionality involved. It is also noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description but is only limited by the scope of the appended claims.

What is claimed is:

1. An actuator system comprising:
   a hydraulic actuator having a primary piston having a piston head arranged within a housing, the primary piston actuatable between a fully retracted position and a fully extended position, the hydraulic actuator defining an adjustable retract chamber on a first side of the piston head and an adjustable extend chamber on a second side of the piston head opposite the first side;
   a control element configured to control a supply of pressure to each of the retract chamber and the extend chamber; and
   an actuator valve coupled to the housing of the hydraulic actuator, the actuator valve having a secondary piston that is biased into the retract chamber in an open flow state and when the primary piston is in the fully retracted state position the piston head urges the secondary piston into a closed flow state,
   wherein the actuator valve defines a flow chamber therein, wherein in the open flow state fluid can be passed through the flow chamber and in the closed flow state the fluid is prevented from passing through the flow chamber,
   wherein the fluid that passes through the actuator valve is fluidly separate from a fluid within the hydraulic actuator.

2. The actuator system of claim 1, wherein the actuator valve includes a biasing element configured to bias the secondary piston into the open flow state.

3. The actuator system of claim 1, wherein the control element is an electrohydraulic servo valve.

4. The actuator system of claim 1, further comprising an extension pressure line hydraulically coupling the control element and the extend chamber of the hydraulic actuator and a retraction pressure line hydraulically coupling the control element and the retract chamber of the hydraulic actuator.

5. The actuator system of claim 1, wherein the fluid passing through the actuator valve is a cooling fluid.

6. The actuator system of claim 1, further comprising a piston cooling chamber arranged about a portion of the primary piston, wherein the piston cooling chamber is fluidly connected to the flow chamber of the actuator valve.

7. The actuator system of claim 6, wherein the fluid is passed through the flow chamber to the piston cooling chamber and then to a downstream system.

8. The actuator system of claim 1, further comprising an aircraft system, wherein the primary piston is configured to actuate a component of the aircraft system.

9. A method of operating an actuator system comprising:
   supplying hydraulic fluid to a retract chamber of a hydraulic actuator to cause a primary piston to fully retract within a housing;
   urging a secondary piston of an actuator valve into a closed flow state by application of force from a piston head of the primary piston and against a biasing force applied to the secondary piston;
   transitioning the primary piston from a fully retracted state toward an extended state and exposing a retract chamber within the housing of the hydraulic actuator;

urging the secondary piston into an open flow state of the actuator valve, wherein a portion of the secondary piston extends into the retract chamber to expose a flow chamber of the actuator valve; and passing a fluid through the flow chamber of the actuator valve when the actuator valve is in the open flow state, wherein the fluid that passes through the actuator valve is fluidly separate from the hydraulic fluid within the hydraulic actuator.

10. The method of claim 9, wherein the actuator valve includes a biasing element configured to applying the biasing force to the secondary piston and toward the open flow state.

11. The method of claim 9, wherein actuator system comprises a control element configured to supply the hydraulic fluid to each of the retract chamber and an extend chamber defined within the housing of the hydraulic actuator.

12. The method of claim 11, wherein the control element is an electrohydraulic servo valve.

13. The method of claim 11, further comprising an extension pressure line hydraulically coupling the control element and the extend chamber of the hydraulic actuator and a retraction pressure line hydraulically coupling the control element and the retract chamber of the hydraulic actuator.

14. The method of claim 9, wherein the fluid passing through the actuator valve is a cooling fluid.

15. The method of claim 9, further comprising a piston cooling chamber arranged about a portion of the primary piston, wherein the piston cooling chamber is fluidly connected to the flow chamber of the actuator valve.

16. The method of claim 15, further comprising passing the fluid through the flow chamber to the piston cooling chamber and then to a downstream system.

17. The method of claim 9, further comprising an aircraft system coupled to the actuator system, the method further comprising actuating a component of the aircraft system by movement of the primary piston between the fully retracted state and the fully extended state.

* * * * *